United States Patent
Kreisl et al.

[11] Patent Number: 5,913,394
[45] Date of Patent: Jun. 22, 1999

[54] DEVICE FOR INSURING THE RETURN FLOW OF OIL IN WET-RUNNING COUPLINGS AND BRAKES

[75] Inventors: Joachim Kreisl, Leverkusen; Norbert Gober, Odenthal, both of Germany

[73] Assignee: SMS Eumuco GMBH, Leverkusen, Germany

[21] Appl. No.: 08/860,541

[22] PCT Filed: Dec. 12, 1995

[86] PCT No.: PCT/DE95/01777

§ 371 Date: Jul. 31, 1997

§ 102(e) Date: Jul. 31, 1997

[87] PCT Pub. No.: WO96/18831

PCT Pub. Date: Jun. 20, 1996

[30] Foreign Application Priority Data

Dec. 13, 1994 [DE] Germany .......................... 44 47 455.5

[51] Int. Cl.[6] .............................. F16D 67/04; F16D 65/78
[52] U.S. Cl. ................ 192/18 A; 192/70.12; 192/113.34
[58] Field of Search ............................... 192/18 A, 12 C, 192/103 F, 70.12, 113.34

[56] References Cited

U.S. PATENT DOCUMENTS

| | | |
|---|---|---|
| 2,712,373 | 7/1955 | Smirl .................................... 192/103 F |
| 3,618,425 | 11/1971 | Wickman ............................... 192/18 A |
| 3,730,301 | 5/1973 | Heck . |
| 4,046,235 | 9/1977 | Shutt . |
| 4,074,663 | 2/1978 | Cory . |
| 4,142,619 | 3/1979 | Spokas . |
| 4,491,202 | 1/1985 | Schmitt . |
| 4,633,986 | 1/1987 | Matson . |
| 4,739,865 | 4/1988 | Yater et al. . |
| 5,016,739 | 5/1991 | Im ....................................... 192/103 F |
| 5,046,595 | 9/1991 | Sumiyoshi et al. .................. 192/103 F |
| 5,667,045 | 9/1997 | Cummings ............................ 192/18 A |

FOREIGN PATENT DOCUMENTS 29 44 008 A1   8/1980   Germany .
1502608   3/1978   United Kingdom .

*Primary Examiner*—Rodney H. Bonck
*Attorney, Agent, or Firm*—Herbert Dubno; Andrew Wilford

[57] ABSTRACT

A coupling apparatus has a stationary housing and a pair of parts inside the housing and rotatable about a common axis. One of the parts normally rotates continuously. Coupling elements between the parts are engageable together to rotationally couple the parts to each other and are separable for free relative rotation of the parts relative to each other. A row of teeth on the one part mesh with a drive pinion of a pump mounted on the housing for circulating coolant and lubricating oil through the coupling elements.

3 Claims, 1 Drawing Sheet

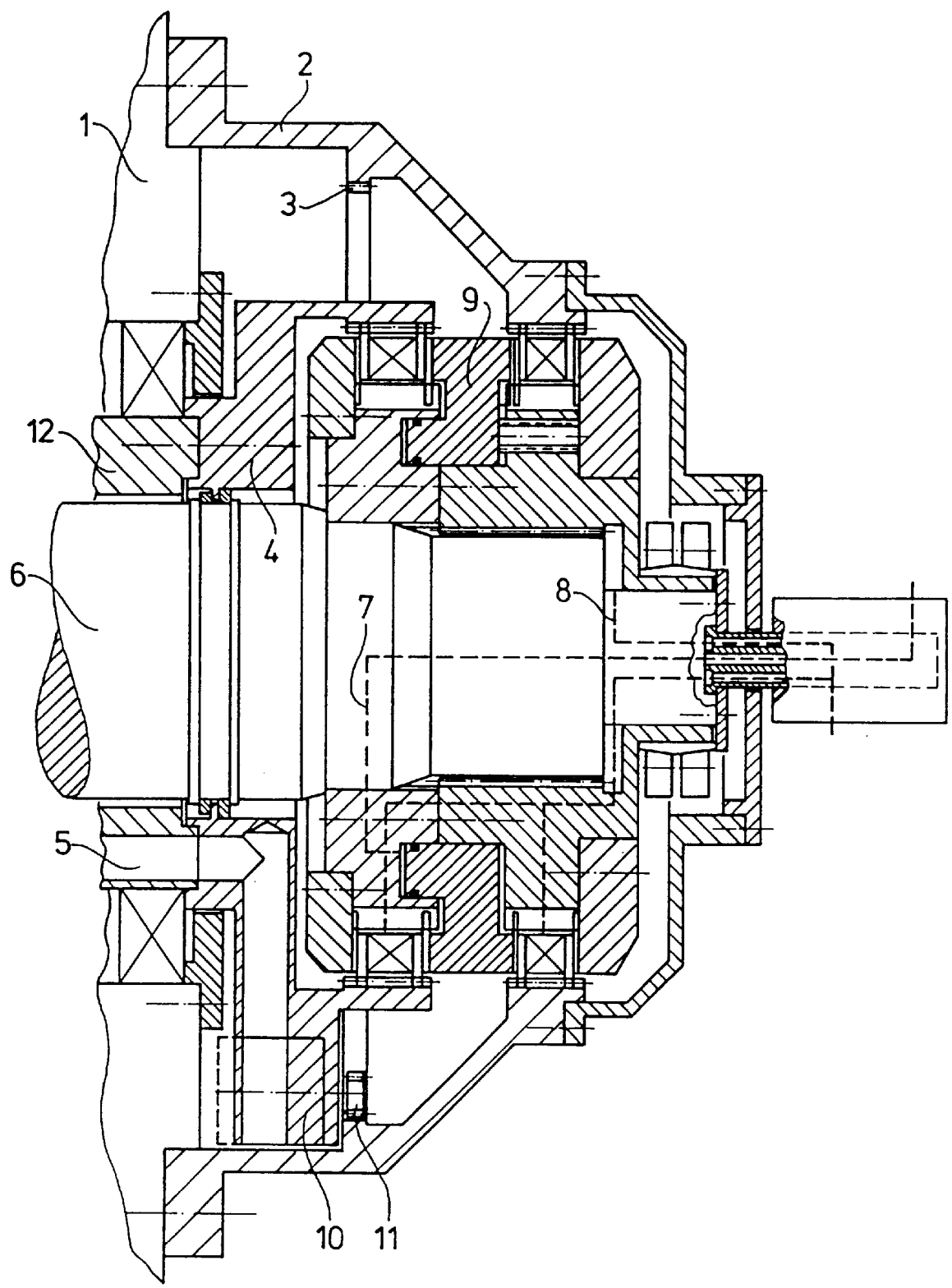

DEVICE FOR INSURING THE RETURN FLOW OF OIL IN WET-RUNNING COUPLINGS AND BRAKES

CROSS REFERENCE TO RELATED APPLICATIONS

This application is the U.S. national phase of PCT application PCT/DE95/01777 filed Dec. 12, 1995 with a claim to the priority of German application P44 47 455.5 filed Dec. 13, 1994.

FIELD OF THE INVENTION

The invention relates to the construction of coupling elements in machines for deforming.

BACKGROUND OF THE INVENTION

With the known hydraulically operated coupling elements (clutches and brakes) through which coolant and lubricant oil is circulated, the flow in the clutch and brake of the oil is mainly left to the effect of gravity on the oil. There are also systems wherein the rotating clutch housing forms inside the housing an inertially acting oil ring. The dip tube projecting from this oil ring produces the oil circulation to the coupling elements, that is through the brake housing and the mount (tube shaft). Naturally it is a disadvantage that in order to create sufficient centrifugal force to pump the oil a certain minimum rotation rate is necessary. Thus this solution is limited to coupling elements with a high rotation rate (control drives, drives on slow shafts, e.g. eccentric shafts).

In addition the effectiveness is very strongly dependent on temperature because of the viscosity characteristics of the oil used for cooling and lubricating. As a result on starting up the apparatus and when the oil is cold there are substantial problems in the coupling operation (sticking of the oil-bathed disks on braking to produce a pulsation) and in the seal of the coupling elements that are relatively sealed with a labyrinth. As a result of the poorer oil flow on startup it can happen in extreme cases that the entire oil content of the container serving to drive the coupling elements (hydraulic supply) is forced into the coupling elements and thus the monitored oil level in the container causes the machine to shut down even before oil circulation has started. This is countered by providing expensive heating systems for preheating the oil along with large-capacity supplies.

OBJECTS AND SUMMARY OF THE INVENTION

The goal of the invention is to produce a rotation-speed and temperature independent circulation of coolant and lubricant oil with the known coupling elements which makes possible a machine operation free of the above-named service problems and which increases the applicability of the coupling elements with rotating clutch housings in the region of lower rotation speeds.

The object of the invention is to provide an apparatus that surely circulates oil through the coupling elements and thus increases the usability of the coupling element as well as its service life. According to the invention inside the rotating clutch housing is a row of teeth which drives an oil pump via a pinion.

BRIEF DESCRIPTION OF THE DRAWING

A preferred embodiment of the invention is shown more closely in the drawing.

SPECIFIC DESCRIPTION

The flywheel 1 (or drive wheel) is rotatably mounted on the tube shaft 12 and drives the clutch part of the clutch-brake unit 9 via the continuously rotating clutch housing 2.

The brake part of 9 is rotationally arrested by the brake housing 4 and the tube shaft 12. To switch on (engage the clutch) hydraulic oil under pressure moves via the clutch-oil connection 7 through the output shaft 6 into 9, switching off (braking) is done by spring force in the brake when the fluid pressure is relieved. The coolant-circulating path 8 is formed also by bores in the output shaft 6, the oil serving for a continuous cooling and lubrication of the coupling parts and flows out of the clutch-brake unit 9 at the edge of the rotating clutch housing 2. Fixed to the brake housing 4 or constituted only as a pump impeller in the brake housing 4 is an oil pump 10 (e.g. a vane pump). The pump is driven continuously by a pinion 11 via the row of teeth 3. The transmission ratio between 3 and 11 determines an optimal conformity of the amount conveyed by the pump 10 to the amount of oil to be carried off via a passage 5. Thus the circulation of the oil from the hydraulic supply to the coupling elements in the machine and back remains constant because it is taken care of by the pump 10.

We claim:

1. An apparatus comprising:
    a stationary tube shaft extending along an axis and having an end forming a brake part;
    a flywheel normally rotatable about the axis on the tube shaft;
    a clutch part fixed to the flywheel, surrounding the brake part, and juxtaposed with the brake part;
    an output shaft extending along and rotatable about the axis and having an inner end inside the clutch part;
    means including coupling elements between the output shaft and the parts engageable with the brake part for arresting the output shaft and with the clutch part for rotationally coupling the output shaft to the flywheel;
    a row of teeth on the clutch part; and
    means including a pump carried on the tube shaft and having a drive pinion meshing with the teeth for circulating coolant and lubricating oil through the coupling elements when the flywheel is rotating.

2. The coupling apparatus defined in claim 1 wherein the coupling elements include clutch disks engageable between the clutch part and the output shaft for coupling same together and brake disks engageable between the brake part and the output shaft for arresting the output shaft.

3. The coupling apparatus defined in claim 2, further comprising
    a ring displaceable in one direction to press the clutch disks together and thereby couple the clutch part and output shaft and in the opposite direction to press the brake disks together and thereby arrest the output shaft.

* * * * *